US010638210B1

(12) United States Patent
El Guindi et al.

(10) Patent No.: US 10,638,210 B1
(45) Date of Patent: Apr. 28, 2020

(54) ACCELEROMETER-BASED WALKING DETECTION PARAMETER OPTIMIZATION FOR A HEARING DEVICE USER

(71) Applicant: SONOVA AG, Staefa (CH)

(72) Inventors: Nadim El Guindi, Zürich (CH); Nina Stumpf, Maennedorf (CH); Ullrich Sigwanz, Hombrechtikon (CH); Nathalie Leuthold, Staefa (CH)

(73) Assignee: Sonova AG, Staefa (CH)

( * ) Notice: Subject to any disclaimer, the term of this patent is extended or adjusted under 35 U.S.C. 154(b) by 0 days.

(21) Appl. No.: 16/370,777

(22) Filed: Mar. 29, 2019

(51) Int. Cl.
*H04R 1/02* (2006.01)
*G01C 22/00* (2006.01)
*H04R 1/28* (2006.01)
*H04R 1/08* (2006.01)
*H04R 1/10* (2006.01)
*G01P 15/00* (2006.01)

(52) U.S. Cl.
CPC ........... *H04R 1/028* (2013.01); *G01C 22/006* (2013.01); *G01P 15/00* (2013.01); *H04R 1/08* (2013.01); *H04R 1/1016* (2013.01); *H04R 1/2826* (2013.01)

(58) Field of Classification Search
CPC ........ H04R 1/028; H04R 1/08; H04R 1/1016; H04R 1/2826; H04R 2460/07; H04R 2225/41; H04R 25/30; H04R 5/04; G01C 22/006; G01P 15/00; H04W 4/027; H04W 4/025; H04W 4/026; G06F 3/017; G06F 1/163; G06K 9/00335; G06K 9/00355; G06K 9/00348; H04M 2250/12

USPC ..... 381/312, 91, 314, 315, 58, 304, 74, 122; 700/94
See application file for complete search history.

(56) References Cited

U.S. PATENT DOCUMENTS

| | | | |
|---|---|---|---|
| 6,898,550 B1 | 5/2005 | Blackadar et al. | |
| 8,655,004 B2 | 2/2014 | Prest et al. | |
| 8,767,989 B2 | 7/2014 | Burns et al. | |
| 9,706,290 B2 | 7/2017 | Grinker | |
| 9,924,276 B2 | 3/2018 | Wenzel | |
| 10,080,080 B2 | 9/2018 | Grinker | |
| 2015/0066422 A1* | 3/2015 | Zhang | G01C 22/006 702/141 |
| 2015/0078575 A1* | 3/2015 | Selig | H04R 1/1091 381/74 |
| 2016/0150331 A1 | 5/2016 | Wenzel | |

(Continued)

FOREIGN PATENT DOCUMENTS

| | | |
|---|---|---|
| CN | 107278377 | 10/2017 |
| EP | 3005731 | 3/2017 |

(Continued)

*Primary Examiner* — Norman Yu
(74) *Attorney, Agent, or Firm* — ALG Intellectual Property, LLC

(57) ABSTRACT

An exemplary hearing device configured to be worn by a user includes an accelerometer configured to output accelerometer data representative of an acceleration of the hearing device and a processor configured to maintain data representative of a walking detection algorithm, determine an optimized parameter for the user for use with the walking detection algorithm, and apply, in accordance with the optimized parameter, the walking detection algorithm to the accelerometer data to determine a walking state of the user while the user wears the hearing device.

20 Claims, 10 Drawing Sheets

(56) References Cited

U.S. PATENT DOCUMENTS

| | | | |
|---|---|---|---|
| 2016/0255433 A1* | 9/2016 | Grinker | H04R 1/1016 |
| | | | 381/380 |
| 2016/0345107 A1 | 11/2016 | Van Dijk et al. | |
| 2017/0227375 A1* | 8/2017 | Parikh | G01C 25/00 |
| 2017/0295425 A1 | 10/2017 | Grinker | |
| 2018/0020296 A1 | 1/2018 | Wenzel | |

FOREIGN PATENT DOCUMENTS

| | | |
|---|---|---|
| EP | 3264798 | 3/2018 |
| WO | 2014/194932 | 12/2014 |
| WO | 2014/198306 | 12/2014 |
| WO | 2016/137713 | 9/2016 |

* cited by examiner

ACCELEROMETER-BASED WALKING DETECTION PARAMETER OPTIMIZATION FOR A HEARING DEVICE USER

BACKGROUND INFORMATION

A hearing device may enable or enhance hearing by a user wearing the hearing device by providing audio content received by the hearing device to the user. For example, a hearing aid may provide an amplified version of the audio content to the user to enhance hearing by the user. As another example, a sound processor included in a cochlear implant system may provide electrical stimulation representative of the audio content to the user to enable hearing by the user.

In some cases, it may be desirable for a hearing device to adjust one or more settings and/or operations based on whether a user of the hearing device is walking, running, or otherwise taking steps. To this end, a hearing device may be configured to detect a walking state of a user by applying a walking detection algorithm to accelerometer data generated by an accelerometer included in the hearing device. However, due to processing constraints, a conventional walking detection algorithm executed by a hearing device is relatively basic and can have difficulty detecting some types of walking activities, such as slow and/or irregular walking often exhibited by elderly and/or disabled users.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
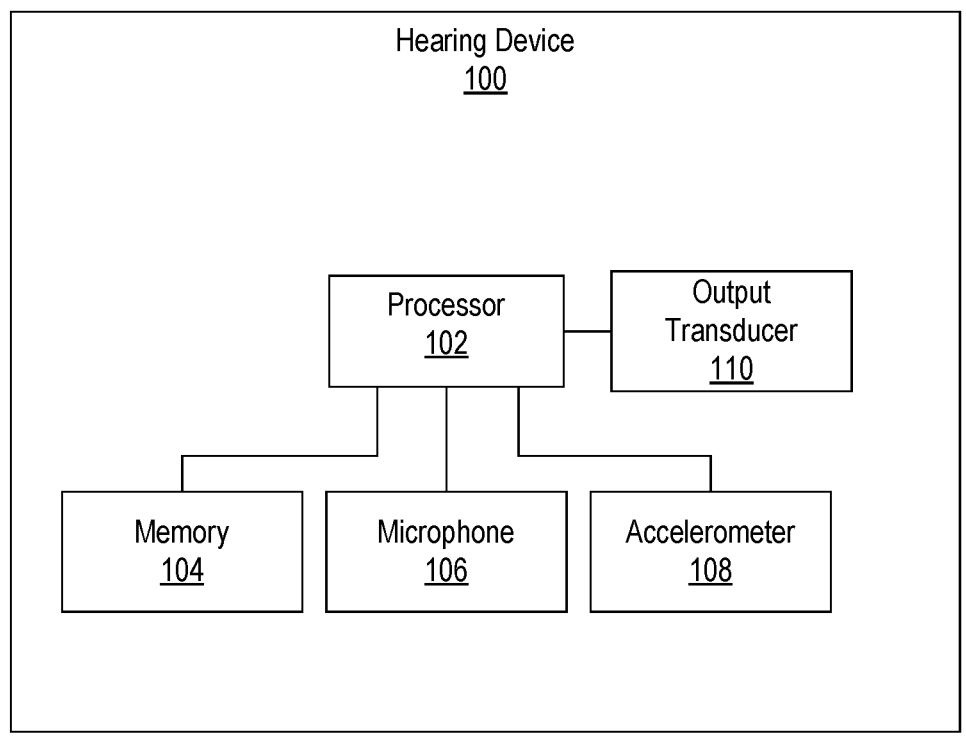
FIG. 1 illustrates an exemplary hearing device according to principles described herein.

Accelerometer-based walking detection parameter optimization for hearing device user is described herein. In some examples, a hearing device configured to be worn by a user may include an accelerometer and a processor communicatively coupled to the accelerometer. The accelerometer is configured to output accelerometer data representative of an acceleration of the hearing device. The processor is configured to maintain data representative of a walking detection algorithm controlled by one or more parameters, determine an optimized parameter for the user for use with the walking detection algorithm, and apply, in accordance with the optimized parameter, the walking detection algorithm to the accelerometer data to determine a walking state of the user while the user wears the hearing device.

As used herein, a "walking state" of a user indicates whether the user is performing some type of walking activity (i.e., taking steps). For example, the walking state may indicate that the user is walking, running, going up or down stairs, etc. The walking state may alternatively indicate that the user is not performing a walking activity (e.g., the user may be standing still, sitting, lying down, etc.).

By optimizing a parameter used by a walking detection algorithm executed by a hearing device for a particular user, the systems, hearing devices, and methods described herein are configured to facilitate more accurate, computationally efficient, and personalized walking state detection by the hearing device compared to conventional detection techniques. This, in turn, may allow the hearing device to more effectively and accurately adjust one or more settings and/or perform other operations based on the walking state of the user.

To illustrate, a walking detection algorithm executed by a hearing device may be configured to detect a walking state by detecting a cadence of the user and determining whether the detected cadence is within a particular cadence range. As used herein, cadence refers to number of steps per second, and may be expressed in terms of Hertz (Hz). The cadence range used by the walking detection algorithm may initially be relatively wide in order to detect a variety of different walking styles. For example, the cadence range could initially be between 0.5 and 9 Hz to account for a variety of different walking activities. This wide range may make it computationally difficult for the walking detection algorithm to accurately detect cadences at the lower end of the cadence range (e.g., between 0.5 and 1.2 Hz). In accordance with the principles described herein, the hearing device may determine that the user never has a cadence greater than a particular value (e.g., 3 Hz). This may be because the user is older and never runs, for example. Whatever the reason, in response to this determination, the hearing device may optimize the cadence range used by the walking detection algorithm by lowering an upper limit of the cadence range to be at or close to 3 Hz. This may improve the effectiveness of the walking detection algorithm in determining the walking state of this particular user. This and other examples of optimizing parameters used by the walking detection algorithm will be described in more detail below.

Various embodiments will now be described in more detail with reference to the figures. The systems, hearing devices, and methods described herein may provide one or more of the benefits mentioned above and/or various additional and/or alternative benefits that will be made apparent herein.

FIG. 1 illustrates an exemplary hearing device 100. Hearing device 100 may be implemented by any type of hearing device configured to enable or enhance hearing by a user wearing hearing device 100. For example, hearing device 100 may be implemented by a hearing aid configured to provide an amplified version of audio content to a user, a sound processor included in a cochlear implant system configured to provide electrical stimulation representative of audio content to a user, a sound processor included in a bimodal hearing system configured to provide both amplification and electrical stimulation representative of audio content to a user, or any other suitable hearing prosthesis.

As shown, hearing device 100 includes a processor 102 communicatively coupled to a memory 104, a microphone 106, an accelerometer 108, and an output transducer 110. Hearing device 100 may include additional or alternative components as may serve a particular implementation.

Microphone 106 may be implemented by one or more suitable audio detection devices configured to detect an audio signal presented to a user of hearing device 100. The audio signal may include, for example, audio content (e.g., music, speech, noise, etc.) generated by one or more audio sources included in an environment of the user. Microphone 106 may be included in or communicatively coupled to hearing device 100 in any suitable manner. Output transducer 110 may be implemented by any suitable audio output device, for instance a loudspeaker of a hearing device or an output electrode of a cochlear implant system.

Accelerometer 108 may be implemented by any suitable sensor configured to detect acceleration of hearing device 100 and output accelerometer data representative of the acceleration of hearing device 100. While hearing device 100 is being worn by a user, the detected acceleration of hearing device 100 is representative of movement by the user. For example, as described herein, the detected acceleration may be representative of a walking activity (e.g., normal walking, jogging, sprinting, going up or down stairs, jumping, dancing, etc.) performed by the user.

In some examples, accelerometer 108 is included in hearing device 100. Alternatively, accelerometer 108 may be included in a different device (e.g., a watch or a mobile device worn or carried by the user). In these alternative configurations, hearing device 100 may access accelerometer data generated by accelerometer 108 by being communicatively coupled to the different device.

In some examples, accelerometer 108 and at least a portion of processor 102 are implemented within the same chip. For example, as will be described below, an accelerometer chip included in hearing device 100 may be configured to perform the functions of accelerometer 108 and execute a walking detection algorithm.

Memory 104 may be implemented by any suitable type of storage medium and may be configured to maintain (e.g., store) data generated, accessed, or otherwise used by processor 102. For example, memory 104 may maintain data representative of a plurality of sound processing programs that specify how processor 102 processes audio content (e.g., audio content included in the audio signal detected by microphone 106) to present the audio content to a user. Memory 104 may also maintain data representative of settings for the sound processing program as described in more detail herein. To illustrate, if hearing device 100 is a hearing aid, memory 104 may maintain data representative of sound processing programs that specify audio amplification schemes (e.g., amplification levels, etc.) used by processor 102 to provide an amplified version of the audio content to the user. As another example, if hearing device 100 is a sound processor included in a cochlear implant system, memory 104 may maintain data representative of sound processing programs that specify stimulation schemes used by processor 102 to direct a cochlear implant to provide electrical stimulation representative of the audio content to the user.

Processor 102 may be configured to perform various processing operations with respect to an audio signal detected by microphone 106. For example, processor 102 may be configured to receive the audio signal (e.g., a digitized version of the audio signal) from microphone 106 and process the audio content contained in the audio signal in accordance with a sound processing program to present the audio content to the user.

Processor 102 may be further configured to maintain (e.g., within memory 104) data representative of a walking detection algorithm that is controlled by one or more parameters. In some examples, as described herein, processor 102 may determine an optimized parameter for a particular user of hearing device 100 for use with the walking detection algorithm. Processor 102 may apply, in accordance with the optimized parameter, the walking detection algorithm to the accelerometer data to determine a walking state of the user while the user wears hearing device 100. Based on the walking state, processor 102 may adjust one or more settings of hearing device 100 and/or perform one or more operations with respect to a component of hearing device 100. These operations are described in more detail herein. These and other operations that may be performed by processor 102 are described in more detail herein. In the description that follows, any references to operations performed by hearing device 100 may be understood to be performed by processor 102 of hearing device 100.

Figure 2:
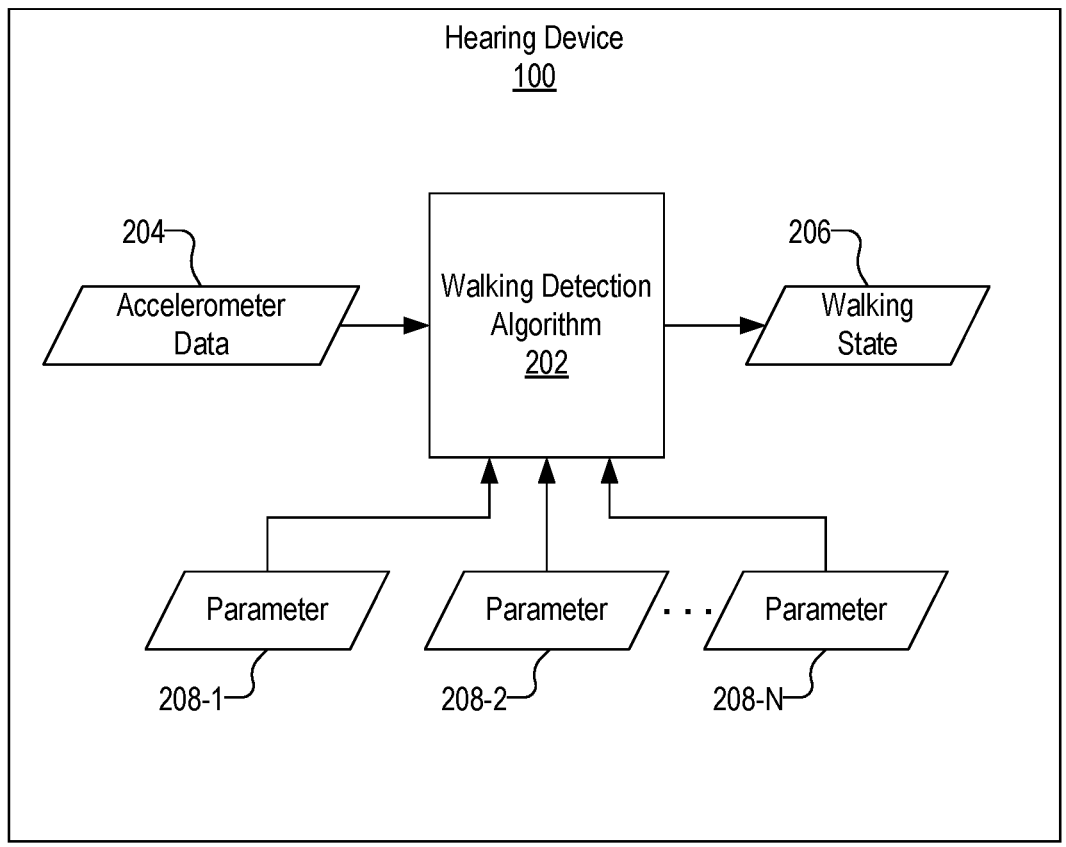
FIG. 2 illustrates an exemplary walking detection algorithm that may be maintained and executed by a hearing device according to principles described herein.

FIG. 2 illustrates an exemplary walking detection algorithm 202 that may be maintained and executed by hearing device 100. Walking detection algorithm 202 may be implemented by one or more processor-executable instructions, such as a program configured to be executed by processor 102.

As shown, walking detection algorithm 202 is configured to be applied by hearing device 100 to accelerometer data 204, which is output by accelerometer 108. In other words, accelerometer data 204 is applied by hearing device 100 as an input to walking detection algorithm 202. Based on accelerometer data 204, walking detection algorithm 202 is configured to output data representative of a walking state 206 of the user.

As shown, walking detection algorithm 202 is controlled by (i.e., operates in accordance with) a plurality of parameters 204-1 through 204-N (collectively "parameters 204"). While multiple parameters 204 are shown in FIG. 2, it will be recognized that walking detection algorithm 202 may be controlled by only a single parameter in some examples or by only two parameters in other examples.

Figure 3:
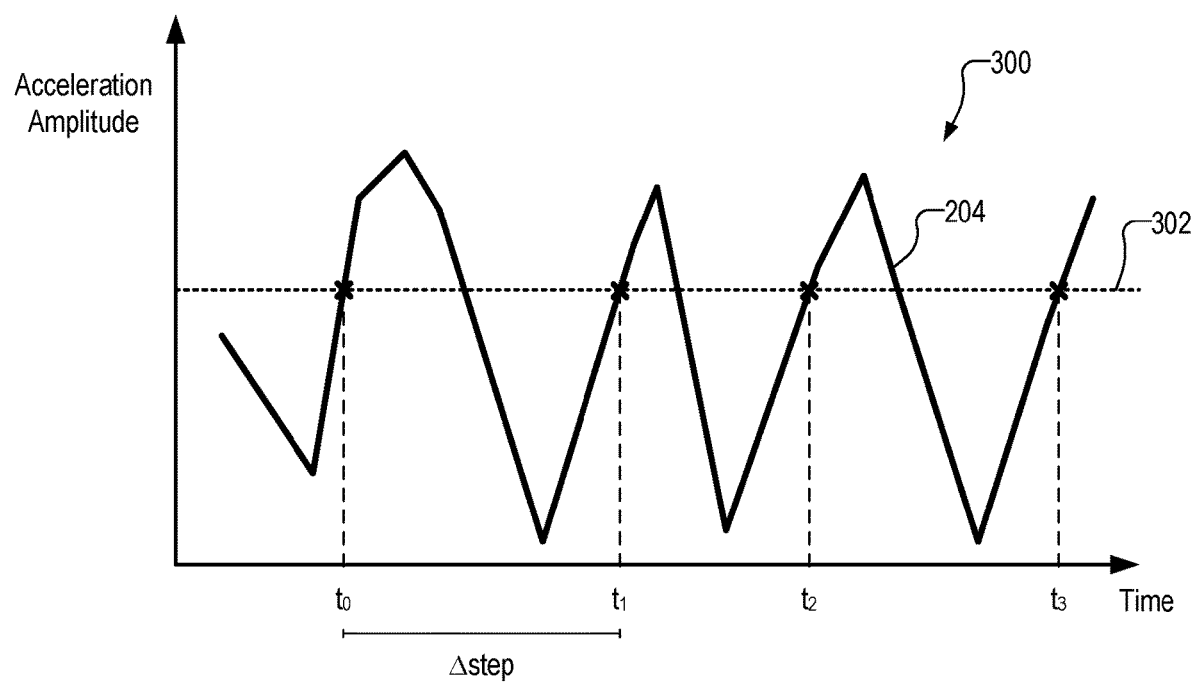
FIG. 3 shows a graph of accelerometer data that may be output by an accelerometer while a user of a hearing device is taking steps according to principles described herein.

Parameters 204 may include any setting and/or rule used by walking detection algorithm 202 to detect a walking state of a user of hearing device 100. To illustrate, FIG. 3 shows a graph 300 of accelerometer data 204 (e.g., a y-axis component of accelerometer data 204) that may be output by accelerometer 108 while the user of hearing device 100 is taking steps. As shown, the amplitude of accelerometer data 204 fluctuates with a certain regularity over time. Analysis of these fluctuations by walking detection algorithm 202 may be used to detect cadence of the user. Based on the detected cadence, the walking state of the user may be determined.

To illustrate, one particular parameter 204 used by walking detection algorithm 202 may be an amplitude threshold 302. In some examples, if walking detection algorithm 202 detects that a rising amplitude of accelerometer data 204 crosses amplitude threshold 302, walking detection algorithm 202 determines that a step has been taken by the user. In FIG. 3, these crossings of amplitude threshold 302 are illustrated by X's and occur at times $t_0$, $t_1$, $t_2$, and $t_3$. Hence, in the example of FIG. 3, walking detection algorithm 202 detects that four steps are taken during the time period illustrated in FIG. 3.

Another parameter 204 used by walking detection algorithm 202 may be a variation threshold for a Δstep, where Δstep is defined by the time between two successive detected steps. For example, the Δstep between the step detected at time to and the step detected at time $t_1$ is equal to $t_1$-$t_0$. In some examples, a certain number (e.g., five) of sequential Δsteps with variation below a certain variation threshold must be detected by walking detection algorithm 202 for walking detection algorithm 202 to determine that the user is performing a walking activity.

Another parameter 204 used by walking detection algorithm 202 may be a cadence range. The cadence range may be defined by a lower limit (e.g., a particular cadence, such as 0.5 Hz) and an upper limit (e.g., a particular cadence, such as 9 Hz). In accordance with this parameter, walking detection algorithm 202 must detect a cadence within the cadence range to determine that the user is performing a walking activity. In some examples, walking detection algorithm 202 may use multiple cadence ranges to detect different types of walking activities. For example, walking detection algorithm 202 may use a "walking" cadence range to detect normal walking, a "running" cadence range to detect running, etc.

Hearing device 100 may be configured to optimize one or more parameters 204 for a user of hearing device 100. In this manner, walking detection algorithm 202 may more effectively detect a walking state of the user compared to walking detection algorithms that use generic parameters not customized to particular users.

Figure 4:
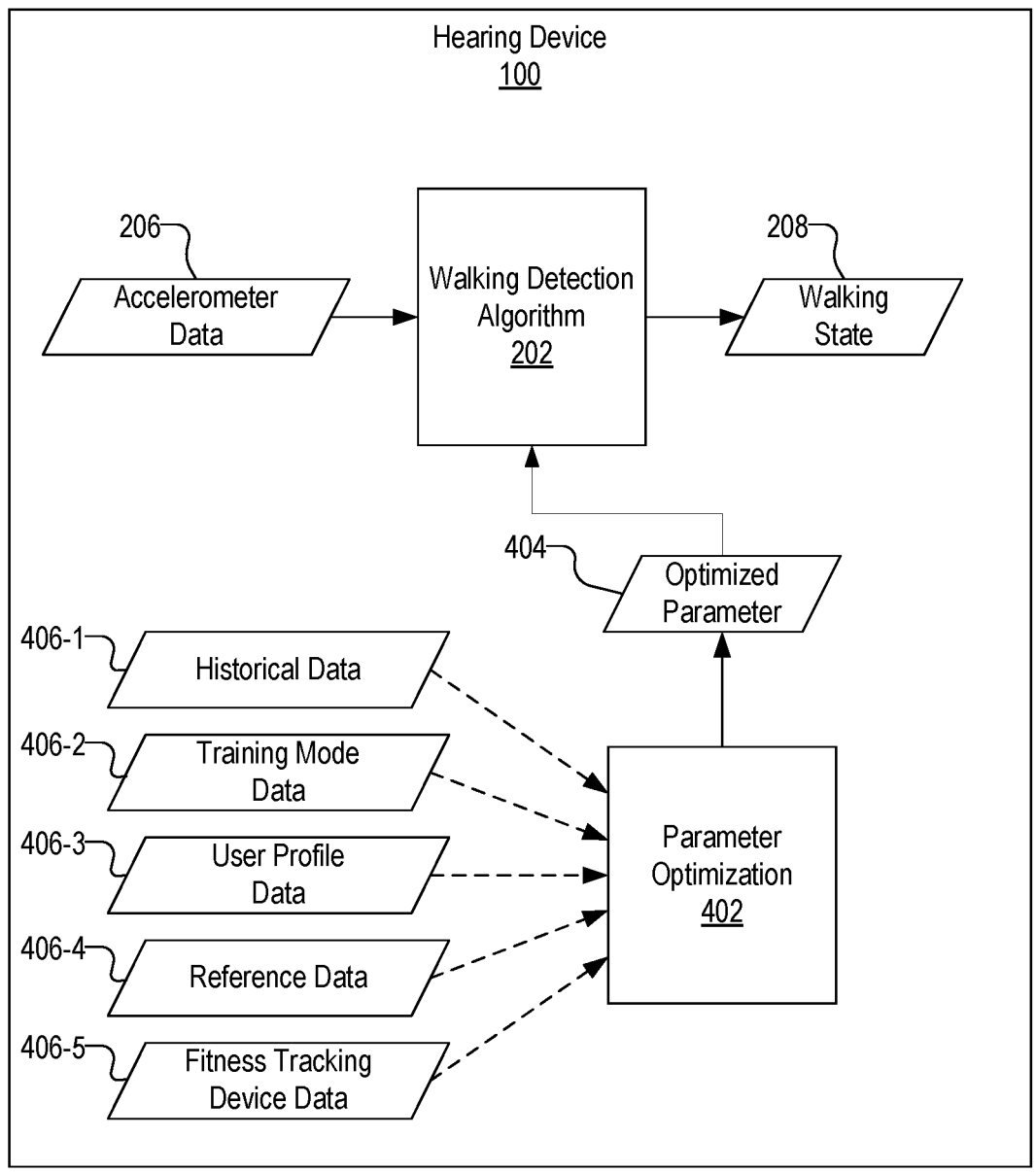
FIG. 4 shows that a hearing device may execute a parameter optimization function to generate an optimized parameter for use with a walking detection algorithm according to principles described herein.

To illustrate, FIG. 4 shows that hearing device 100 may execute a parameter optimization function 402 to generate an optimized parameter 404 for use with walking detection algorithm 202. Parameter optimization function 402 may be implemented by one or more processor-executable instructions, such as a program configured to be executed by processor 102.

As shown, parameter optimization function 402 may generate optimized parameter 404 based on various types of data 406 (e.g., data 406-1 through data 406-5) provided as one or more inputs to parameter optimization function 402. For example, parameter optimization function 402 may generate optimized parameter 404 based on historical data 406-1, training mode data 406-2, user profile data 406-3, reference data 406-4, and/or fitness tracking device data 406-5. It will be recognized that parameter optimization function 402 may additionally or alternatively generate optimized parameter 404 based on one or more other types of data as may serve a particular implementation. Examples of parameter optimization based on each of the types of data 406 shown in FIG. 4 will now be provided.

Historical data 406-1 is representative of one or more performance attributes of hearing device 100 and/or a user of hearing device 100 as detected by hearing device 100 over time. For example, hearing device 100 may detect a cadence attribute of the user during a particular time period and save the cadence attribute as historical data 406-1. The time period may be a set time period, a sliding time window equal to a certain amount of time prior to a current time, and/or any other predefined amount of time as may serve a particular implementation. The cadence attribute may be a maximum cadence, average cadence, and/or any other attribute associated with the cadence as detected by walking detection algorithm 202 during the time period.

Based on the cadence attribute, parameter optimization function 402 may generate optimized parameter 404 by adjusting, based on the cadence attribute, any of the parameters 204 used by walking detection algorithm 202. For example, parameter optimization function 402 may use the detected cadence attribute to adjust the cadence range used by walking detection algorithm 202 to determine walking state 208 and/or the amplitude threshold used by walking detection algorithm 202 to detect an occurrence of a step by the user.

To illustrate, the detected cadence attribute may be a maximum cadence of the user during the time period. In this example, parameter optimization function 402 may generate optimized parameter 404 by setting an upper limit for the cadence range based on the maximum cadence. For example, parameter optimization function 402 may set the upper limit for the cadence range to be equal to or slightly above the maximum cadence detected by hearing device 100 during the time period. In this manner, the cadence range used by walking detection algorithm 202 may be reduced (e.g., compared to an initial cadence range used by walking detection algorithm 202), which may increase an effectiveness of the walking detection algorithm 202 in detecting walking activities for users who typically walk slowly.

As another example, the detected cadence attribute may be a maximum and/or average acceleration amplitude of acceleration data 206 during the time period. Based on this maximum and/or average acceleration amplitude, parameter optimization function 402 may generate optimized parameter 404 by adjusting the amplitude threshold used by walking detection algorithm 202 to detect an occurrence of a step by the user. For example, if the maximum acceleration amplitude of acceleration data 206 is relatively low (e.g., below a predetermined threshold), parameter optimization function 402 may generate optimized parameter 404 by reducing the amplitude threshold. This may allow walking detection algorithm 202 to more accurately detect occurrences of steps by the user.

Training mode data 406-2 may be representative of data detected by hearing device 100 when hearing device 100 is explicitly put in a training mode by a user. For example, hearing device 100 may receive user input that places hearing device 100 in a training mode corresponding to a particular walking activity. While in the training mode, hearing device 100 may monitor a cadence of the user. The monitored cadence may be stored as training mode data 406-2 and used by parameter optimization function 402 to determine optimized parameter 404.

To illustrate, a user of hearing device 100 may press a button on hearing device 100, select an option in an application (e.g., a mobile device application) paired with hearing device 100, and/or otherwise provide user input representative of a command to place hearing device 100 in a training mode corresponding to normal walking. While in the training mode, hearing device 100 may monitor a cadence of the user. Because hearing device 100 knows that the user is performing a normal walking activity while in the training mode, cadence attributes detected by hearing device 100 may be associated with the normal walking activity and stored as training mode data 406-2. Based on training mode data 406-2, parameter optimization function 402 may generate optimized parameter 404 in any of the ways described herein.

In some examples, the user input representative of the command to place hearing device 100 in the training mode may be provided remotely by a person other than the user of hearing device 100. For example, the user input may be provided by a clinician or other professional located remotely from the user of hearing device 100. To this end, hearing device 100 may be configured to communicate with a remote computing device by way of a network.

Figure 5:
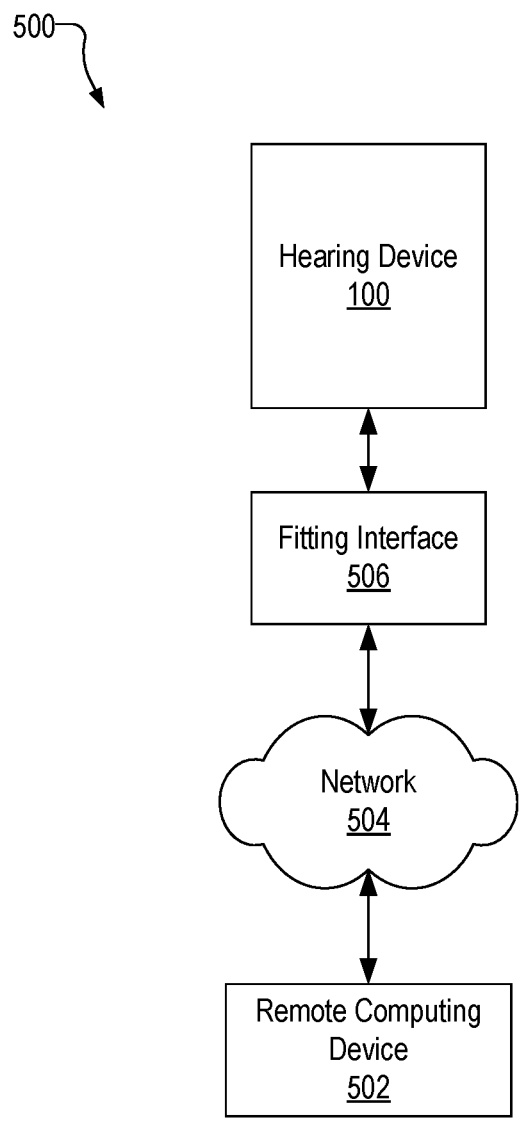
FIG. 5 shows an exemplary configuration in which a hearing device is configured to communicate with a remote computing device by way of a network according to principles described herein.

To illustrate, FIG. 5 shows an exemplary configuration 500 in which hearing device 100 is configured to communicate with a remote computing device 502 (e.g., a computing device used by a clinician) by way of a network 504 (e.g., the Internet, a local area network, or any other suitable network). To facilitate this communication, hearing device 100 may include and/or interface with a fitting interface 506. Fitting interface 506 is configured to transmit and receive commands by way of network 504.

Using configuration 500, a clinician may initiate a distance support session to place hearing device 100 in the training mode while the user is performing a particular walking activity. For example, the user may be jogging when the clinician initiates the distance support session. While users jogging, remote computing device 502 may receive cadence attributes as detected by walking detection algorithm 202 from hearing device 100 by way of fitting interface 506. Remote computing device 502 may analyze the cadence attributes and transmit a command back to hearing device 100 by way of network 504 for parameter optimization 402 to generate and optimized parameter 404 based on the analysis.

Returning to FIG. 4, user profile data 406-3 is representative of one or more physical traits of the user. For example, user profile data 406-3 may be representative of an age, gender, weight, health status, walking ability, and/or other physical trait of the user. User profile data 406-3 may be generated in any suitable manner. For example, the user may fill out a questionnaire provided by a clinician. The user's responses in the questionnaire may be stored as user profile data 406-3.

Additionally or alternatively, user profile data 406-3 may be generated based on fitting data maintained or accessed by hearing device 100. For example, during a fitting session, data representative of the user's age, gender, and/or weight may be saved as fitting data stored by a fitting program executed by a clinician's computing device. Hearing device 100 may be configured to access the fitting data while connected to the clinician's computing device and use the fitting data to generate and/or update user profile data 406-3.

Parameter optimization function 402 may generate optimized parameter 404 based on user profile data 406-3 in any of the ways described herein. For example, user profile data 406-3 may indicate that the user is an 80-year-old female. Based on this information, it may be assumed that the user will never have a cadence greater than a particular value. Accordingly, parameter optimization function 402 may reduce a cadence range used by walking detection algorithm 202 to detect walking state 208.

Reference data 406-4 is representative of data specific to a particular class of which the user of hearing device 100 is a part. For example, reference data 406-4 may include data from scientific studies or other literature that indicates walking tendencies and/or abilities of certain classes of people (e.g., people in certain age groups). Reference data 406-4 may be accessed by hearing device 100 in any suitable manner. For example, reference data 406-4 may be stored on remote computing device 502 and accessed by hearing device 100 by way of network 504. Parameter optimization function 402 may generate optimized parameter 404 based on reference data 406-4 in any of the ways described herein.

Fitness tracking device data 406-5 is representative of data acquired by one or more fitness tracking devices utilized by the user of hearing device 100. For example, the user may utilize a fitness tracking watch, heart rate monitor, and/or other electronic device configured to count steps taken by the user, detect a heart rate of the user, determine a distance traveled by the user, and/or detect any other fitness-related attribute as may serve a particular implementation. Hearing device 100 may access this data acquired by the fitness tracking device and provide the data as input to parameter optimization function 402 for use in generating optimized parameter 404 in any suitable manner. For example, hearing device 100 may periodically connect to a fitness tracking device and/or to a mobile device (e.g., a fitness tracking app on the mobile device) paired with the fitness tracking device to download or otherwise access fitness tracking device data 406-5.

Parameter optimization function 402 may use fitness tracking device data 406-5 to generate optimized parameter 404 in any suitable manner. For example, parameter optimization function 402 may compare data output by walking detection algorithm 202 to fitness tracking device data 406-5 to determine a difference between the data and modify one or more of parameters 204 to minimize or eliminate the difference.

Based on walking state 208 determined by walking detection algorithm 202, hearing device 100 may perform one or more operations. For example, hearing device 100 may adjust one or more settings of hearing device 100 to be optimized for the determined walking state 208.

Figure 6:
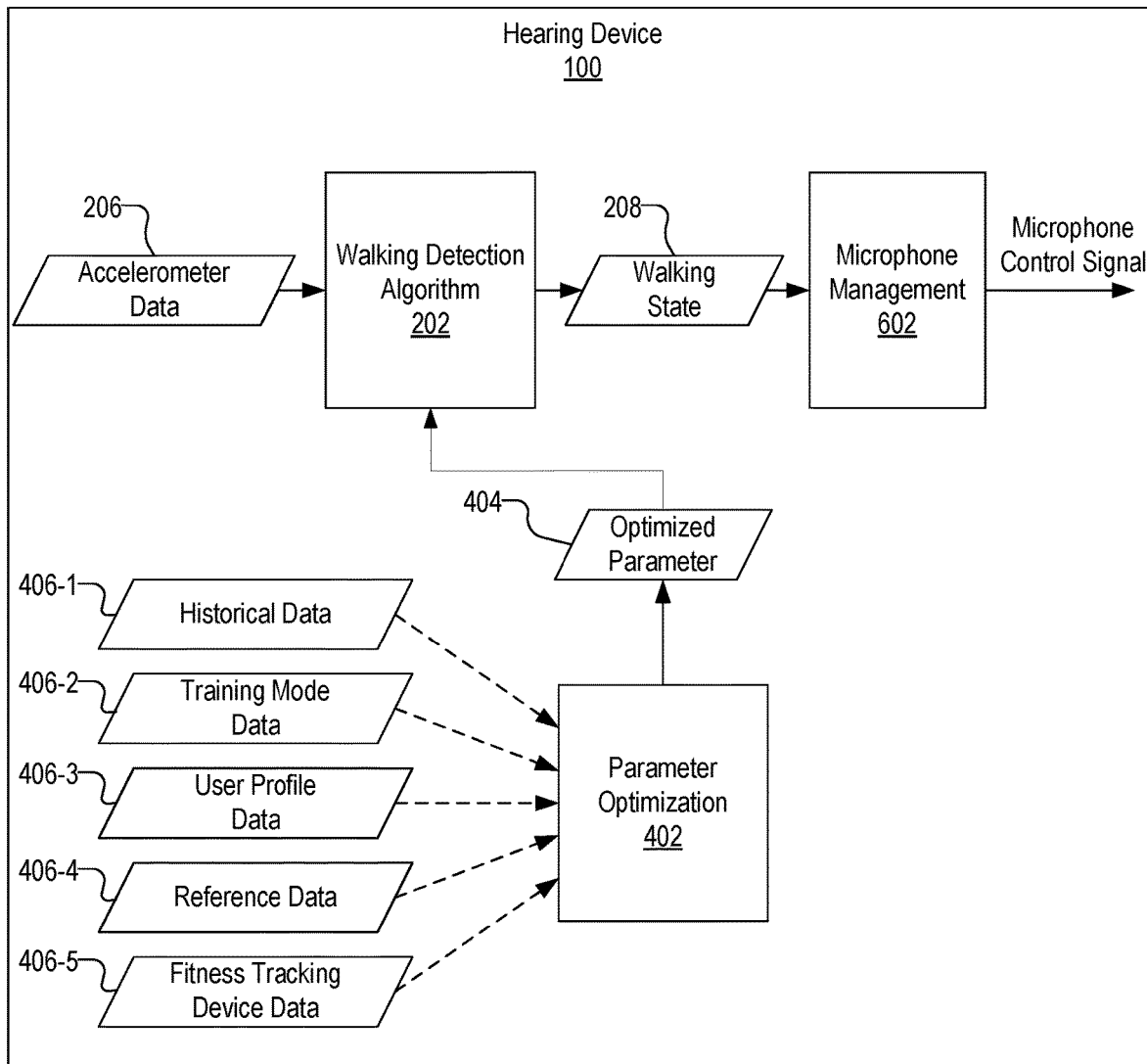
FIG. 6 shows that a hearing device may execute a microphone management function to generate a microphone control signal configured to control one or more operations with respect to a microphone.

By way of example, hearing device 100 may perform an operation with respect to microphone 106 based on the determined walking state 208. To illustrate, FIG. 6 shows that hearing device 100 may execute a microphone management function 402 to generate, based on walking state 208, a microphone control signal configured to control one or more operations with respect to microphone 106. Microphone management function 602 may be implemented by one or more processor-executable instructions, such as a program configured to be executed by processor 102.

In some examples, microphone control signal is configured to control a directivity of a beamforming feature of microphone 106. For example, if walking state 208 indicates that the user is performing a walking activity, microphone management function 602 may output a microphone control signal that reduces a directivity of the beamforming function of microphone 106.

To illustrate, the beamforming feature may conventionally be used to increase directivity of microphone 106 when hearing device 100 detects speech in noisy environments. However, if the user is walking while having a conversation with someone walking next to him, the beamforming feature may inadvertently suppress speech coming from the speaker because of the speaker's position to the side of the user. Accordingly, if walking detection algorithm 202 determines that the user is walking, microphone management function 602 may decrease the directivity of the microphone 106 so as to not suppress sound coming from the side of the user while the user is walking.

Figure 7:
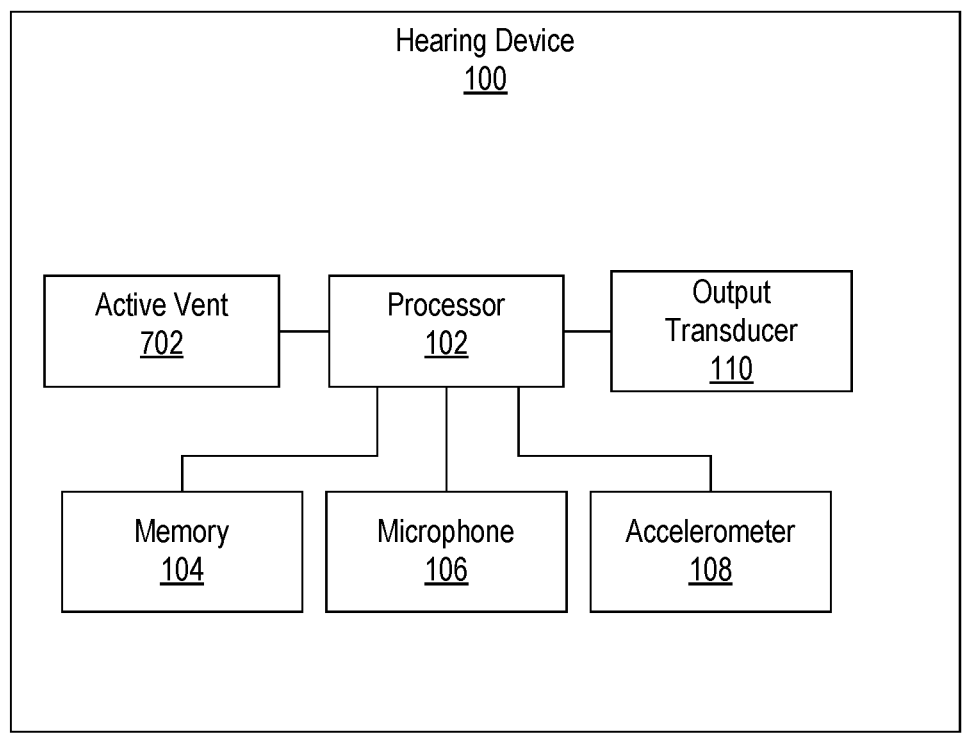
FIG. 7 shows an embodiment in which a hearing device includes an active vent according to principles described herein.

As another example, hearing device 100 may be configured to adjust, based on walking state 208, a size of an active vent included in hearing device 100. To illustrate, FIG. 7 shows an embodiment in which hearing device 100 also includes an active vent 702. Active vent 702 is configured to control an amount of occlusion of the user's ear canal by hearing device 100. By so doing, active vent 702 may be configured to minimize an occlusion effect caused by hearing device 100.

As used herein, an occlusion effect occurs when an object fills the outer portion of a person's ear canal, and that person perceives "hollow" or "booming" echo-like sounds of their own voice. It is caused by bone-conducted sound vibrations reverberating off the object filling the ear canal. With an occluded ear canal, the body movements can sound really loud due to a boost of sound pressure (usually below 500 Hz) in the ear canal. This feeling leads to discomfort like a sense of pressure or blockage in the ear.

In a typical situation, the pressure level in the ear canal stays constant. However, the pressure level in the ear canal may increase when the person is performing a walking activity, eating, talking, and/or making other body movements.

Figure 8:
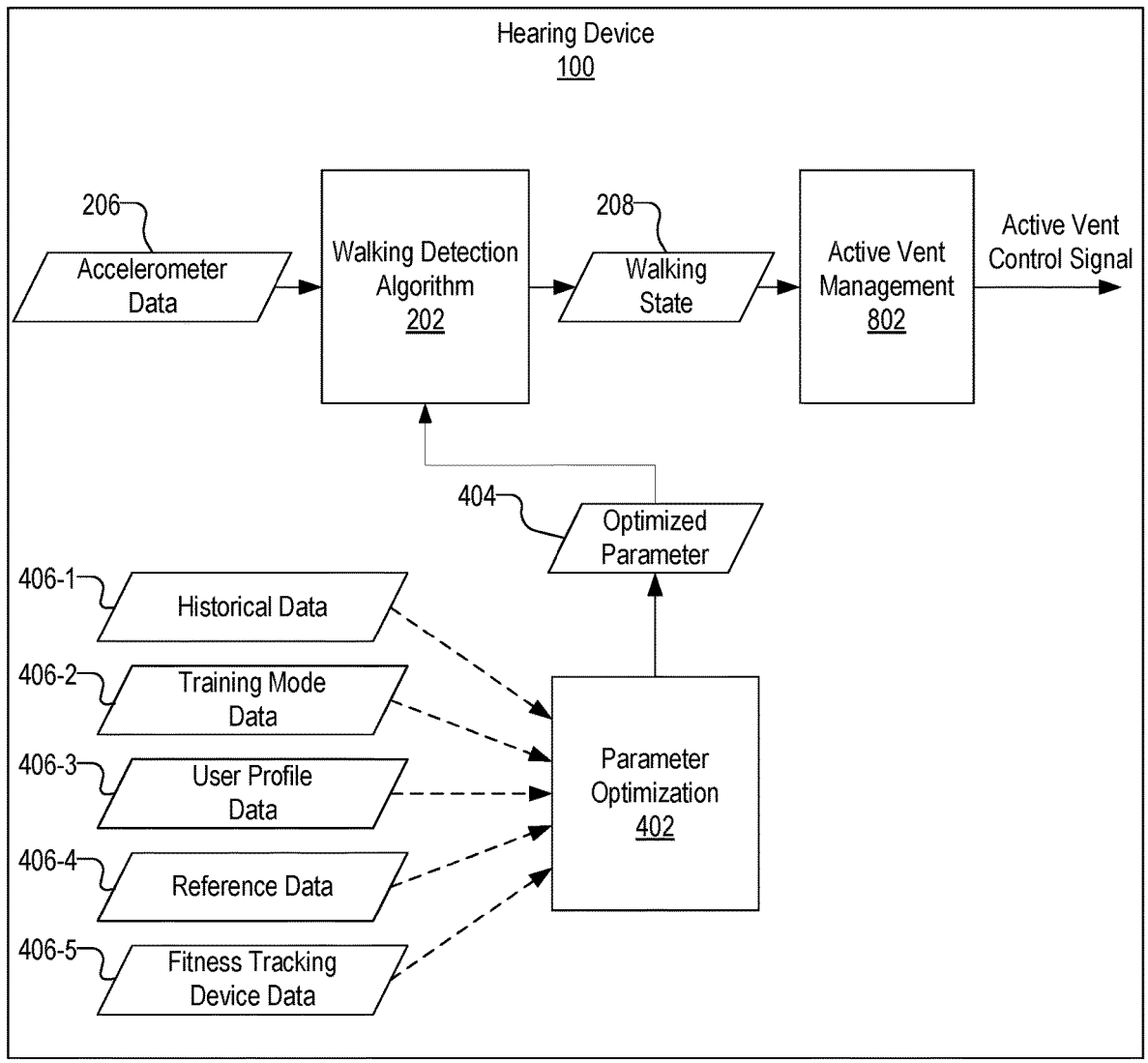
FIG. 8 shows that a hearing device may execute an active vent management function to generate an active vent control signal configured to control a size of active vent according to principles described herein.

To reduce the occlusion effect in hearing device 100, FIG. 8 shows that hearing device 100 may execute an active vent management function 802 to generate, based on walking state 208, an active vent control signal configured to control a size of active vent 702. Active vent management function 802 may be implemented by one or more processor-executable instructions, such as a program configured to be executed by processor 102.

To illustrate, if walking state 208 indicates that the user switches from being sedentary to performing a walking activity, active vent management function 802 may output an active vent control signal configured to increase a size of (e.g., open to some degree) active vent 702 in order to alleviate the increased pressure level associated with the walking activity. Likewise, if walking state 208 indicates that the user switches from performing a walking activity to being sedentary, active vent management function 802 may output an active vent control signal configured to decrease a size of (e.g., close to some degree) active vent 702.

In some alternative embodiments, active vent management function 802 may output an active vent control signal configured to decrease a size of (e.g., close to some degree) active vent 702 in order to reduce an occlusion effect. This may be performed, for example, if hearing device 100 includes an active noise canceller. By decreasing the size of active vent 702, the active noise canceller may be able to more effectively cancel the occlusion effect.

The degree to which active vent 702 is adjusted may depend on the type of walking activity detected by walking detection algorithm 202. For example, active vent 702 may be opened more when the user is sprinting compared to when the user is slowly walking.

The degree to which active vent 702 is adjusted may additionally or alternatively depend on one or more other factors. For example, degree to which active vent 702 is adjusted may depend on one or more environmental conditions (e.g., a sound level of the environment) and/or an acceptance level of the user to occlusion. This is because the degree to which active vent 702 is open affects performance of hearing device 100. For example, the more open active vent 702 is, the lower the perceived sound quality produced by hearing device 100 may be to the user.

Figure 9:
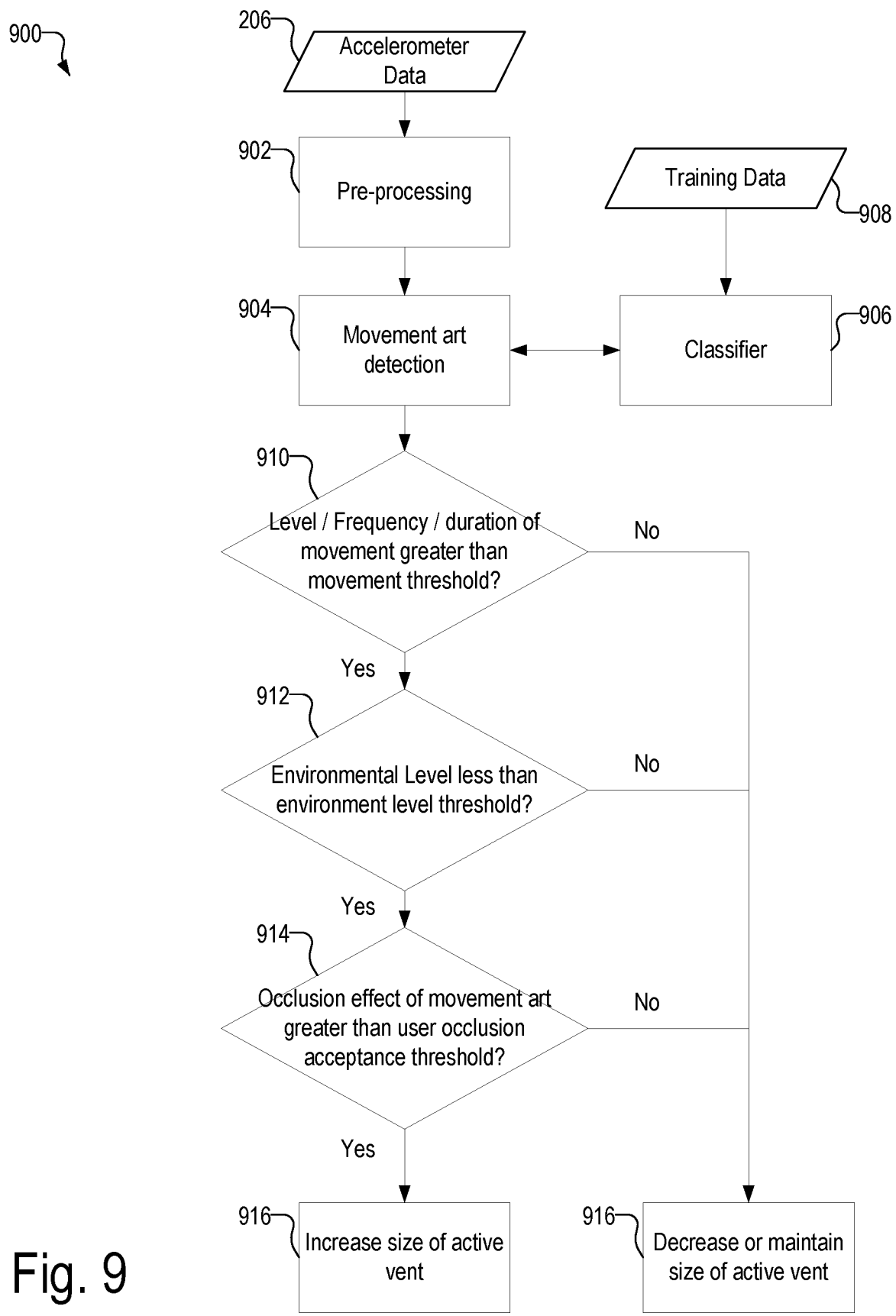
FIG. 9 shows an exemplary flow diagram of operations that may be implemented by a hearing device according to principles described herein.

FIG. 9 shows an exemplary flow diagram 900 of operations that may be implemented by hearing device 100 (e.g., by active vent management function 802) to determine a degree to which active vent 702 is to be opened or closed.

As shown, accelerometer data 206 is input into a pre-processing function 902. Pre-processing function 902 may be configured to perform any suitable pre-processing operations with respect to accelerometer data 206, which may be in raw form.

The pre-processed accelerometer data is then input into a movement art detection function 904. Movement art detection function 904 may be configured to determine a particular art (e.g., type) of movement performed by the user based on the pre-processed accelerometer data. Such movement may include a walking activity and/or any other type of movement performed by the user.

Movement art detection function 904 may perform movement art detection based on input provided by a classifier function 906. Classifier function 906 may be trained with training data 908 representative of various types of movement that may be represented by accelerometer data 206.

In decision block 910, hearing device 100 determines whether a level, frequency, and/or duration of the detected movement is greater than a movements threshold. The movement threshold may define a minimum movement level, frequency, and/or duration required before a size of active vent 702 is increased.

In decision block 912, hearing device 100 determines whether an environmental level is less than an environmental level threshold. The environmental level may be, for example, a sound level of the environment of hearing device 100 as detected by microphone 106. The environmental level threshold may define a maximum environmental level required before a size of active vent 702 is increased.

In decision block 914, hearing device 100 determines whether an occlusion effect of detected movement art is greater than a user occlusion acceptance threshold. The user occlusion acceptance threshold may define a minimum occlusion effect level that is required before a size of active vent 702 is increased.

If the answer to decision blocks 910, 912, and 914 is yes, the size of active vent 702 is increased (e.g., opened). If the answer to any one of decision blocks 910, 912, and 914 is no, the size of active vent 702 is decreased (e.g., closed) or maintained.

In some examples, walking detection algorithm 202 is configured to determine a particular walking activity being performed by the user. For example, walking state 208 may distinguish between normal walking, jogging, and sprinting. Based on the particular walking activity, hearing device 100 may perform an operation specific to the particular walking activity. For example, if the user is jogging, hearing device 100 may perform an operation (e.g., by adjusting a directivity of a beamforming feature of microphone 106) optimized for jogging.

Figure 10:
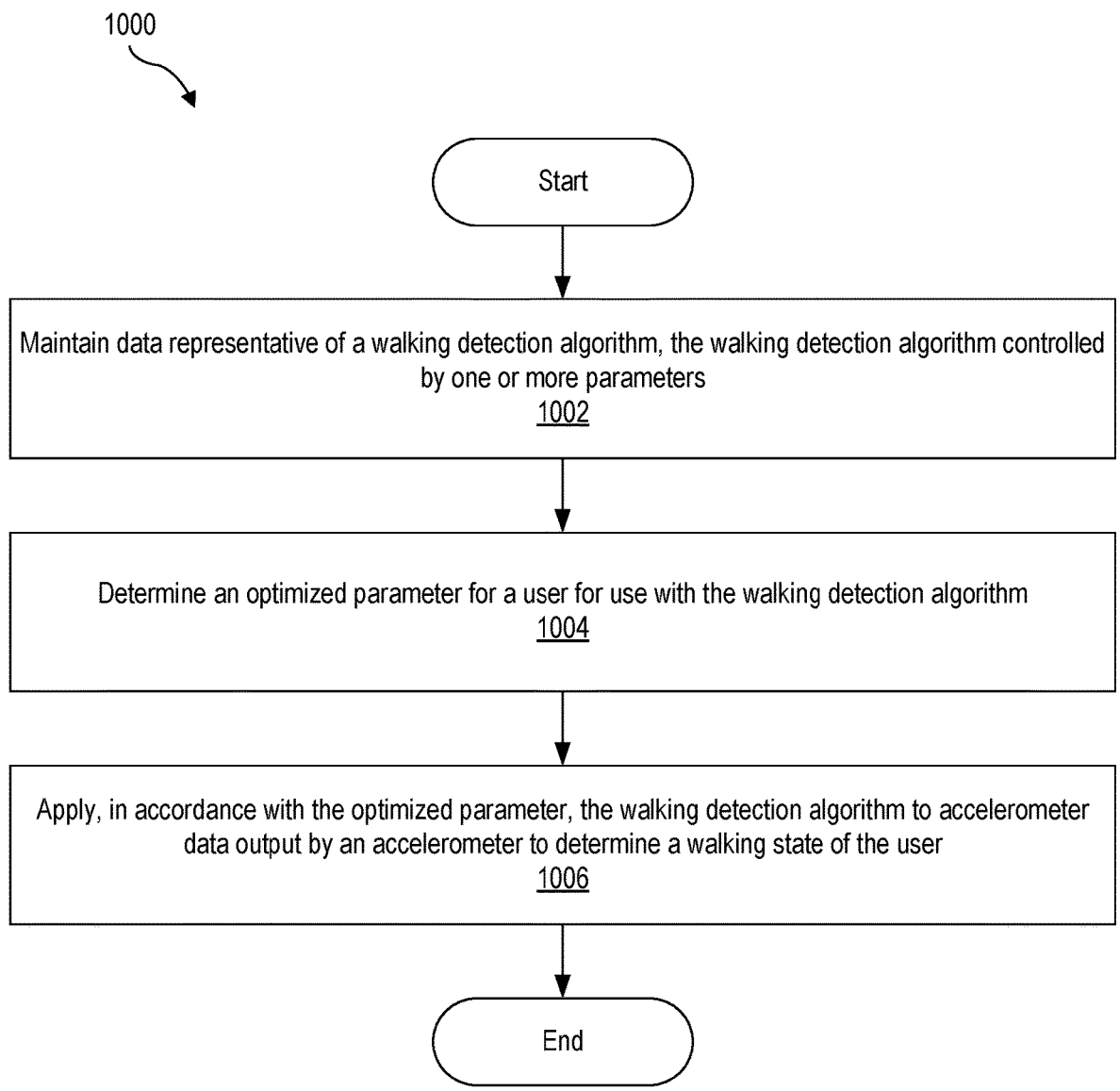
FIG. 10 illustrates an exemplary method according to principles described herein.

FIG. 10 illustrates an exemplary method configured to be performed by a hearing device (e.g., hearing device 100). While FIG. 10 illustrates exemplary operations according to one embodiment, other embodiments may omit, add to, reorder, and/or modify any of the operations shown in FIG. 10.

In operation 1002, a hearing device maintains data representative of a walking detection algorithm controlled by one or more parameters. Operation 1002 may be performed in any of the ways described herein.

In operation 1004, the hearing device determines an optimized parameter for a user for use with the walking detection algorithm. Operation 1004 may be performed in any of the ways described herein.

In operation 1006, the hearing device applies, in accordance with the optimized parameter, the walking detection algorithm to accelerometer data output by an accelerometer to determine a walking state of the user. Operation 1006 may be performed in any of the ways described herein.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A hearing device configured to be worn by a user, the hearing device comprising:
   a microphone configured to detect an audio signal;
   an accelerometer configured to output accelerometer data representative of an acceleration of the hearing device; and
   a processor communicatively coupled to the accelerometer, the processor configured to:
      maintain data representative of a walking detection algorithm, the walking detection algorithm controlled by one or more parameters;
      determine an optimized parameter for the user for use with the walking detection algorithm;
      apply, in accordance with the optimized parameter, the walking detection algorithm to the accelerometer data to determine a walking state of the user while the user wears the hearing device, the walking state indicating that the user is performing a walking activity and;
      reduce, based on the walking state indicating that the user is performing the walking activity, a directivity of a beamforming feature of the microphone.

2. A hearing device configured to be worn by a user, the hearing device comprising:
   a microphone configured to detect an audio signal;
   an accelerometer configured to output accelerometer data representative of an acceleration of the hearing device; and
   a processor communicatively coupled to the accelerometer, the processor configured to:
      maintain data representative of a walking detection algorithm, the walking detection algorithm controlled by one or more parameters;
      determine an optimized parameter for the user for use with the walking detection algorithm;
      apply, in accordance with the optimized parameter, the walking detection algorithm to the accelerometer data to determine a walking state of the user while the user wears the hearing device, the walking state indicating that the user is not performing a walking activity; and
      increase, based on the walking state indicating that the user is not performing the walking activity, a directivity of a beamforming feature of the microphone.

3. The hearing device of claim 1, further comprising an active vent, wherein the processor is further configured to adjust, based on the walking state, a size of the active vent.

4. The hearing device of claim 3, wherein the adjusting of the size of the active vent is further based on at least one of an environmental condition associated with the hearing device and an acceptance level of the user to occlusion to an ear canal of the user.

5. The hearing device of claim 1, wherein the processor is configured to determine the optimized parameter for the user for use with the walking detection algorithm by:
   detecting a cadence attribute of the user during a time period; and
   adjusting, based on the cadence attribute, at least one of a cadence range used by the walking detection algorithm to determine the walking state of the user and an amplitude threshold used by the walking detection algorithm to detect an occurrence of a step by the user.

6. A hearing device configured to be worn by a user, the hearing device comprising:
   an accelerometer configured to output accelerometer data representative of an acceleration of the hearing device; and
   a processor communicatively coupled to the accelerometer, the processor configured to:
      maintain data representative of a walking detection algorithm, the walking detection algorithm controlled by one or more parameters;
      determine an optimized parameter for the user for use with the walking detection algorithm by detecting a maximum cadence attribute of the user during a time period and setting an upper limit for a cadence range used by the walking detection algorithm to determine the walking state of the user based on the maximum cadence of the user during the time period; and
      apply, in accordance with the optimized parameter, the walking detection algorithm to the accelerometer data to determine a walking state of the user while the user wears the hearing device.

7. A hearing device configured to be worn by a user, the hearing device comprising:
   an accelerometer configured to output accelerometer data representative of an acceleration of the hearing device; and
   a processor communicatively coupled to the accelerometer, the processor configured to:
      maintain data representative of a walking detection algorithm, the walking detection algorithm controlled by one or more parameters;
      determine an optimized parameter for the user for use with the walking detection algorithm by detecting a cadence attribute of the user during a time period and adjusting, based on the cadence attribute, an amplitude threshold used by the walking detection algorithm to detect an occurrence of a step by the user, wherein if the cadence attribute is below a predetermined threshold, the adjusting of the amplitude threshold comprises reducing the amplitude threshold; and
      apply, in accordance with the optimized parameter, the walking detection algorithm to the accelerometer data to determine a walking state of the user while the user wears the hearing device.

8. The hearing device of claim 1, wherein the processor is configured to determine the optimized parameter for the user for use with the walking detection algorithm by:
   receiving user input that places the processor in a training mode corresponding to a particular walking activity;
   monitoring, while in the training mode, a cadence of the user; and
   determining the optimized parameter based on the monitored cadence.

9. The hearing device of claim 8, wherein the processor is configured to receive the user input by receiving the user input remotely over a network from a computing device used by an additional user.

10. The hearing device of claim 1, wherein the processor is configured to determine the optimized parameter for the user for use with the walking detection algorithm by:
accessing user profile data for the user; and
determining the optimized parameter based on the user profile data.

11. The hearing device of claim 1, wherein the processor is configured to determine the optimized parameter for the user for use with the walking detection algorithm by:
accessing reference data specific to a particular class of which the user is a part; and
determining the optimized parameter based on the reference data.

12. The hearing device of claim 1, wherein the processor is configured to determine the optimized parameter for the user for use with the walking detection algorithm by:
accessing data acquired by a fitness tracking device used by the user; and
determining the optimized parameter based on the accessed data.

13. The hearing device of claim 1, wherein:
the processor is configured to apply the walking detection algorithm to the accelerometer data to determine the walking state of the user while the user wears the hearing device by applying the walking detection algorithm to the accelerometer data to determine a particular walking activity being performed by the user; and
the processor is further configured to perform an operation specific to the particular walking activity.

14. The hearing device of claim 2, wherein the processor is configured to determine the optimized parameter for the user for use with the walking detection algorithm by:
receiving user input that places the processor in a training mode corresponding to a particular walking activity;
monitoring, while in the training mode, a cadence of the user; and
determining the optimized parameter based on the monitored cadence.

15. The hearing device of claim 14, wherein the processor is configured to receive the user input by receiving the user input remotely over a network from a computing device used by an additional user.

16. The hearing device of claim 2, wherein the processor is configured to determine the optimized parameter for the user for use with the walking detection algorithm by:
accessing user profile data for the user; and
determining the optimized parameter based on the user profile data.

17. The hearing device of claim 2, wherein the processor is configured to determine the optimized parameter for the user for use with the walking detection algorithm by:
accessing reference data specific to a particular class of which the user is a part; and
determining the optimized parameter based on the reference data.

18. The hearing device of claim 2, wherein the processor is configured to determine the optimized parameter for the user for use with the walking detection algorithm by:
accessing data acquired by a fitness tracking device used by the user; and
determining the optimized parameter based on the accessed data.

19. The hearing device of claim 2, wherein:
the processor is configured to apply the walking detection algorithm to the accelerometer data to determine the walking state of the user while the user wears the hearing device by applying the walking detection algorithm to the accelerometer data to determine a particular walking activity being performed by the user; and
the processor is further configured to perform an operation specific to the particular walking activity.

20. The hearing device of claim 2, further comprising an active vent, wherein the processor is further configured to adjust, based on the walking state, a size of the active vent.

* * * * *